United States Patent [19]

Bock et al.

[11] Patent Number: 4,900,776

[45] Date of Patent: Feb. 13, 1990

[54] POTASSIUM CATALYST SYSTEM FOR PREPARING POLYURETHANE BASED PLYWOOD-PATCH COMPOSITIONS

[75] Inventors: Frank Bock, Crossett, Ark.; Mahfooz Ahmad, Bellaire, Tex.; Frederick C. Dupré, Jr., Altanta, Ga.

[73] Assignee: Georgia-Pacific Resins, Inc., Atlanta, Ga.

[21] Appl. No.: 278,517

[22] Filed: Dec. 1, 1988

[51] Int. Cl.$^4$ ........................ C08L 75/04; C08G 18/22
[52] U.S. Cl. .................................. 524/700; 524/875; 528/57
[58] Field of Search .................. 524/700, 875; 528/57

[56] References Cited

U.S. PATENT DOCUMENTS

| | | | |
|---|---|---|---|
| 1,878,962 | 9/1932 | Meidert | 528/57 |
| 3,164,557 | 1/1965 | Merten | 260/2.5 |
| 3,203,932 | 8/1965 | Frisch et al. | 260/725 |
| 3,245,957 | 4/1966 | Hindersinn et al. | 260/75 |
| 3,245,958 | 4/1966 | Hindersinn et al. | 260/75 |
| 3,407,153 | 10/1968 | Bowman et al. | 260/2.5 |
| 3,714,077 | 1/1973 | Cobbledick et al. | 260/25 |
| 3,801,532 | 4/1974 | Olstowski | 260/33.8 |
| 4,000,103 | 12/1976 | Olstowski | 260/30.2 |
| 4,000,104 | 12/1928 | Olstowski | 260/30.6 |
| 4,001,165 | 1/1977 | Olstowski | 260/33.6 |
| 4,189,541 | 2/1980 | Ohashi et al. | 521/110 |
| 4,284,751 | 8/1981 | Hutt et al. | 528/45 |
| 4,452,829 | 6/1984 | Smith | 521/128 |
| 4,468,478 | 8/1984 | Dexheimer et al. | 521/125 |
| 4,584,362 | 4/1986 | Leckart et al. | 528/55 |

OTHER PUBLICATIONS

A. R. Leckart et al., "New Catalyst for Two-Component Elastomer System" found in Journal of Elasters and Plastics, vol. 19–Oct. 1987, pp. 313–324.

Kirk-Othmer, Third Edition, Encyclopedia of Chemical Technology, vol. 13, p. 900, "Hydrogen-ion Activity to Laminated Materials, Glass".

Azeotropic Data II, No. 35 by American Chemical Society, 1962, p. 17.

CRC Handbook of Chemistry and Physics 55th Edition, 1974, by CRC, Press, pp. D-34 and D-17.

Kirk-Othmer, Third Edition, Encyclopedia of Chemical Technology, Diuretics To Emulsions, vol. 8, p. 39.

Kirk-Othmer, Third Edition, Encyclopedia of Chemical Technology, vol. 7, p. 275, Dialysis To Electron Spin Responance.

Dabco, K-15 and T-45 Catalyst from Air Products and Chemicals, Inc., "Product Bulletins" & MSD Sheet for K-15.

Fomrez EC-683, EC-686, and EC-688 available from WITCO Chemical Corporation, "Product Bulletins".

Primary Examiner—Maurice J. Welsh
Attorney, Agent, or Firm—Banner, Birch, McKie & Beckett

[57] ABSTRACT

A plywood-patching composition is provided based on a noncellular polyurethane elastomer prepared by reacting a polyether or polyester polyol with a polyisocyanate in the presence of a catalytic amount of a substantially anhydrous potassium salt of a carboxylic acid having from 2 to about 20 carbon atoms, and process for preparing same. The catalysts utilized are relatively non-toxic, yet they promote rapid polymerization with essentially no foaming for a wide variety of non-cellular polyurethane elastomeric applications, particularly in plywood-patch applications where even small amounts of foaming is deleterious to the properties thereof.

19 Claims, No Drawings

POTASSIUM CATALYST SYSTEM FOR PREPARING POLYURETHANE BASED PLYWOOD-PATCH COMPOSITIONS

FIELD OF THE INVENTION

This invention relates to polyurethanes and more particularly it relates to non-cellular polyurethanes prepared utilizing a catalytic amount of a substantially anhydrous potassium salt of a carboxylic acid, such polyurethanes being particularly useful in plywood-patch compositions.

BACKGROUND OF THE INVENTION

Urethane polymers or polyurethanes are a large family of polymers with widely varying properties and uses, all based on the reaction product of an organic isocyanate with compounds containing a hydroxyl group. Polyurethane polymers are generally classified into two broad categories: A. foam or urethane foam, and B. elastomers or polyurethane elastomers. Polyurethane foams are polyurethane polymers produced by the reaction of polyisocyanates with a hydroxyl group from a polyol and a polymerization catalyst, in the presence of water and/or an auxiliary blowing agent, such as monofluorotrichloromethane, which allows the polymeric mass to expand into a cellular mass upon reaction. In preparing a non-cellular polyurethane elastomer, no blowing agent or mechanism for producing gas which would lead to cell development should be present. Therefore, the polymer is produced by the reaction of the isocyanate with a hydroxyl group to form urethane linkages in the presence of a polymerization catalyst.

Polyurethane elastomers have been widely used in a variety of applications. They have been used as protective coatings, in the insulation of electrical elements, as caulks, sealants, gaskets, etc. Because of favorable rheology of an elastomer formulation, they can be used to cast intricate forms such as found in the toy industry. They have also been widely used in the preparation of sporting goods, fabric coatings and shoe soles wherein the cured urethane elastomer comes in repeated intimate contact with human beings. The prior art catalysts used to prepare non-cellular elastomers frequently contained toxic mercury and lead compounds and the toxicity was carried over into the cured elastomer. If less toxic organo-tin compounds are employed as catalysts, elastomers having physical properties less than optimum are obtained.

There are several patents relating to various catalysts for reacting isocyanates with polyether polyols. U.S. Pat. No. 3,245,957 to Hendersinn et al. describes a process for reacting an isocyanate with an active hydrogen compound in the presence of an antimony containing catalyst.

U.S. Pat. No. 3,203,932 to Frisch et al. relates to a process for preparing urethane-urea elastomers using metal organic catalysts such as lead, cobalt and zinc naphthenates.

U.S. Pat. No. 4,468,478 to Dexheimer et al. discloses polyurethanes prepared from polyoxalkylenes containing alkali metal or alkaline earth metal catalyst residues chelated with benzoic acid derivatives.

U.S. Pat. No. 3,714,077 to Cobbledick et al. relates to a urethane foam catalyst system consisting of a combination of polyol-soluble organic stannous compounds with polyol-soluble organic bismuth and/or antimony compounds with certain sterically hindered tertiary amines.

U.S. Pat. Nos. 3,801,532, 4,000,103, 4,000,104 and 4,001,165 to Olstowski disclose rapid-setting polyurethanes prepared from diols and polyfunctional isocyanates using organo-metal compounds of tin, zinc, lead, mercury, cadmium, bismuth, cobalt, manganese, antimony and iron, such as stannous octoate, manganese octoate, lead octoate, and dibutyl tin dilaurate.

U.S. Pat. No. 4,584,362 to Leckart et al. relates to polyurethane elastomers prepared utilizing as the sole catalyst therein a bismuth salt of a carboxlic acid having from 2 to 20 carbon atoms.

U.S. Pat. No. 4,452,829 to Smith discloses a sprayable polisocyanate composition prepared by reacting MDI with a triol and a diol utilizing potassium octoate as a trimerization catalyst and an amine-type heat-activated catalyst and, optionally, a tetravelent-tin urethane-type catalyst to provide a solid, coating or foam.

Non-cellular polyurethanes are also used in plywood-patch applications to fill crevices, voids and other imperfections that occur during the manufacture of plywood. Polyurethanes are well suited for such applications because the isocyanates thereof have a natural affinity for wood. Typically, these compositions are applied in an assembly line fashion, thereby requiring a rapid cure at room temperature (generally less than one minute).

Currently, many formulations for this application employ organo-lead catalysts. However, concern over their toxicity has spurred the search for effective, non-toxic, alternative catalysts. Organo-mercury catalysts are too sluggish and are also toxic. Organotins and tertiary amines have a propensity to react with water causing foam formation which would affect the adhesion of the patch to the plywood and the mechanical properties, e.g. hardness, of the patch. As indicated by A. R. Leckart and L. S. Slovin in their article "New Catalyst for Two-Component Elastomer Systems," Journal of Elastomers and Plastics, vol. 19, pages 313–324 (1987), organo-bismuth catalysts appear to hold some promise in this regard, but are about 3 to 5 times more expensive than lead-based catalysts.

Organo-potassium catalysts are a very active species of catalyst, but they have a great affinity for water (hygroscopic) and also a propensity to react with water causing foam formation. Additionally, during their formation, water is produced which is typically not removed due to handling considerations. When the water of reaction is removed, such catalysts become too viscous and even become solid as in the case of potassium octoate, thereby presenting a handling problem. As such, organo-potassium catalyst are typically relegated to the production of foams or applications where foaming is not detrimental thereto. However, there is presently a commercially available plywood-patch composition which appears to be utilizing a potassium-based catalyst believed to be potassium octoate. As to be expected, the patch exhibits slight foam formation due to water contained therein which is sufficient to significantly impair the properties thereof, particularly adhesion, hardness and cure time.

SUMMARY OF THE INVENTION

Accordingly, the present invention relates to a plywood-patch composition based on non-cellular polyurethane elastomers prepared by reacting polyether or polyester polyols having molecular weights of between about 1000 and about 10,000, optionally in conjunction with a smaller percentage of lower molecular weight glycols, which provides for a balance of physical properties required, with an organic polyisocyanate, wherein the ratio of NCO groups to hydroxyl groups is from greater than 1.00 to 1 to about 2.0 to 1, in the presence of a catalytic amount of a substantially anhydrous potassium salt of a carboxylic acid having from 2 to about 20 carbon atoms in the molecule. The catalyst is preferably present at about 0.01 to about 1.5 percent by weight (% w), more preferably at about 0.1 to about 1.0% w, based on the weight of the reactants. The catalyst is preferably dissolved in a suitable solvent forming a catalyst solution prior to incorporation into the plywood-patch composition or polyurethane elastomer formulation. The catalyst preferably forms from about 25% w to about 80% w of the catalyst solution, more preferably from about 50% w to about 80% w of the catalyst solution.

The substantially anhydrous potassium salt of a carboxylic acid (potassium catalyst) preferably contains less than about 0.7% w water based on the weight of the catalyst, more preferably less than about 0.2% w and yet more preferably less than about 0.1% w. Being substantially anhydrous, foam formation is eliminated, or at least reduced below that amount detrimental to the properties of the patch. Preferably, the reaction itself is performed in an anhydrous manner or a dessicant, such as molecular sieve, is added thereto. Once cured, the patch is not significantly affected by the presence of water.

DESCRIPTION OF THE INVENTION

The catalysts of the instant invention are prepared by reacting potassium hydroxide, a potassium-containing base, with a carboxylic acid having 2 to 20 carbon atoms in the molecule, preferably 6 to 16 carbon atoms in the molecule. More specifically, potassium octoate (potassium 2-ethyl hexanoate) has been determined to be a particularly effective catalyst for two component urethane elastomer systems utilized in plywood-patch compositions. The useful carboxylic acids are represented by the formula RCOOH wherein R is a hydrocarbon radical containing 1 to about 19 carbon atoms. R can be alkyl, cycloalkyl, aryl, or alkylaryl, such as methyl, ethyl, propyl, isopropyl, neopentyl, octyl, neononyl, cyclohexyl, phenyl, tolyl or naphthyl. R is preferably alkyl or cycloalkyl, more preferably alkyl.

During the foregoing reaction, water of reaction is formed. The amount of water found in commercially available potassium catalysts ranges from about 1.5% w to about 4% w based on the weight of the catalyst. In order to obtain a suitable catalyst, the catalyst is to be processed to render some substantially anhydrous, wherein the water level is reduced below about 0.7% w, preferably less than about 0.2% w and more preferably less than about 0.1% w, based on the weight of the catalyst.

The substantially anhydrous potassium catalyst may be obtained by a variety of methods. Examples of suitable methods are azeotropic distillation utilizing an azeotrope forming solvent for the catalyst, molecular sieve drying, vacuum distillation and heat drying.

The primary use of the catalyst is to accelerate the reaction between the isocyanate and the hydroxyl groups. The catalyst can be employed in a wide range of non-cellular elastomer formulation systems where reduced catalyst toxicity is desirable, particularly plywood-patch applications. The catalyst provides an alternative to the use of catalysts based on lead, tin or mercury.

Catalysts in use prior to this invention all had the capability of promoting reaction between a hydroxyl group and isocyanates to produce urethane linkages and, ultimately, polyurethane products. The major disadvantage of organo-mercury based catalysts is that, as supplied, they must be handled with extreme caution due to their classification as poisons and the shipping containers must be managed under the Resources Conservation and Recovery Act as hazardous waste. Organo-lead catalysts must also be handled with a great deal of caution due to their toxicity classification as a hazardous substance under the Resources Conservation and Recovery Art. Primarily due to these considerations of toxicity and handling, the use of organo-tin catalysts in non-cellular urethane systems has occurred. As a class, organo-tin compounds do not provide the same type of catalytic performance as organo-mercury and organo-lead compounds, since organo-tin compounds also promote the reaction between moisture and isocyanates in addition to the hydroxyl group-isocyanate reaction. The non-specific nature of the tin catalysts makes their use difficult, with the processor required to go to extreme measures to reduce the presence of moisture in the reactants and other ingredients utilized therein in order to eliminate bubbling or pinhole formation in the elastomers obtained.

In addition, when using catalysts based on mercury, lead or tin, monitoring of the work place environment must be done in order to ascertain ambient air quality compliance with Occupational Safety and Health Administration Standards ("OSHA").

The substantially anhydrous potassium catalyst of this invention provides optimum performance based on tailored get times, adhesion, and hardness in plywood-patch applications and will not contribute to embrittlement of the cured elastomer. Once made substantially anhydrous, the potassium catalyst of the instant invention, as a polymerization catalyst, has minimal effect on the water/isocyanate reaction with moisture levels normally found in a wet/undried formulated urethane system. However, as a precautionary measure, a dessicant such as molecular sieve may be added to the formulation in amounts effective for eliminating, or at least minimizing, foaming. Most importantly, the catalyst has an excellent acute toxicity profile. No occupational exposure limit standard must be met when using the catalyst and only general ventilation is required.

It is apparent, therefore, that, when contrasted with organo-mercury compounds and lead salts of organic acids, the potassium compounds of this invention are much less toxic. The toxicity profiles of organo-tin based chemicals are somewhat poorer, but within about the same order of magnitude as the compounds of this invention, but when considering their limitations based on moisture sensitivity and OSHA monitoring requirements, the safety and ease of use of the compounds of this invention are evident. The toxicity profiles of organo-bismuth based chemicals are within about the some order of magnitude as the compounds utilized herein, but are also about 3 to 5 times more expensive than the potassium catalysts utilized herein.

The primary hydroxy containing reactants used in the preparation of the polyurethane elastomers utilized in the plywood-patch compositions embodying the present invention are primary and secondary hydroxy terminated plyalkylene ethers and polyesters having from 2 to 4 hydroxyl groups and a molecular weight of from about 1000 to about 10,000. They are liquids or are capable of being liquified or melted for handling.

Examples of polyalkylene polyols include linear and branched polyethers having a plurality of ether linkages and containing at least 2 hydroxyl groups and being substantially free from functional groups other than hydroxyl groups. Typical examples of the polyalkylene polyols which are useful in the practice of the invention are the polyethylene glycols, polypropylene glycols and polybutylene ether glycols. Linear and branched copolyethers of ethylene oxide and propylene oxide are also useful in preparing the elastomers of this invention. Those having molecular weights of from about 2000 to about 5000 are preferred. Polyethers having a branch chain network are also useful. Such branch chain polyethers are readily prepared from alkylene oxides and initiators having a functionality greater than 2.

Any organic di or tri isocyanate can be used in the practice of the present invention. Diisocyanates are preferred. Examples of suitable organic polyisocyanates are trimethylene diisocyanate, tetramethylene diisocyanate, pentamethylene diisocyanate and hexamethylene diisocyanate. Examples of aromatic diisocyanates include 2,4 tolylene diisocyanate, and 2,6 tolylene diisocyanate. In addition, methylene diphenyldiisocyanates and polymeric isocyanates based on methylene diphenyldiisocyanates can be employed.

The tolylene diisocyanates (TDI) are monomeric and possess a high vapor pressure relative to the methylene diisocyanates (MDI), which are polymeric. The TDI vapors are very toxic and have a propensity of reacting once in a person's respiratory system. As such TDI poses a handling problem and a health hazard. As a result, MDI is preferred.

The amount of polyisocyanate employed ranges from greater than 1.00 to about 2.0, preferably about 1.05 to about 1.7, moles of NCO in the polyisocyanate per mole of active hydrogen in the polyols.

In certain instances it may be desirable to add a chain extender to complete the formulation of polyurethane polymers by reacting isocyanate groups of adducts or prepolymers. Examples of some types of polyol chain extenders include 1,4 butanediol, diethylene glycol, trimethyol propane and hydroquinone di(beta hydroxyethyl ether).

The chain extender when present is added to about 1% w to about 20% w, preferably about 3% w to about 6% w based on the weight of the reactants.

Plywood-patch compositions may additionally incorporate solvents, fillers, compatibilizers, thixotropes, pigments and anti-settling agents. Suitable solvents are those having a flash point of less than about 110° F. Such solvents are substantially, if not completely, evolved during the reaction forming the polyurethane, during sanding of the patched plywood, and upon exposure to UV light sources, thereby minimizing the staining of vinyl flooring when overlayed on plywood having patches of this material. Suitable fillers include barium sulfate, calcium sulfate, calcium carbonate, silica, and clay particles, such as aluminum silicates, magnesium silicates and kaolin. Suitable compatibilizers are hydroxy containing organic compounds, preferably hydroxy containing monocyclic arenes such as ethoxylated nonyl phenol, which compatibilizes the polyol and aromatic diisocyanate reactants in the formulation.

A preferred plywood-patch composition comprises two components—a component A and a component B wherein component A ranges from about 9 to about 11 parts to each part of B by volume. Component A comprises (a) from about 20 to about 32% w of a poly(oxyalkylene) triol; (b) from 0 to about 7% w of poly(oxyalkylene)diol; (c) from 0 to about 2.5% w of a compatibilizer such as ethoxylated nonyl phenol, preferably from about 1.4 to about 2.5% w; (d) from about 5.5 to about 6.5% w of a solvent such as an aromatic hydrocarbon distillate; (e) from 0 to about 1.5% w of a dessicant such as micronized molecular sieve, preferably about 0.5 to about 1.5% w; (f) from 0 to about 0.45% w of a thixotrope, more preferably from about 0.35 to about 0.45% w; (g) from about 30 to about 70% w of a filler, more preferably from about 50 to about 65% w; (h) from 0 to about 0.15% w of a pigment, more preferably from about 0.5 to about 0.15% w; (i) from 0 to about 0.25% w of an anti-settling agent, more preferably from about 0.15 to about 0.25% w; and (j) from about 0.35 to about 0.45% w of the substantially anhydrous potassium catalyst hereof, wherein the catalyst has preferably been previously dissolved in a suitable solvent forming a catalyst solution prior to incorporation into Component A. In one embodiment, the poly(oxyalkylene)triol is a mixture of a first and a second poly(oxyalkylene)triol, wherein the first poly(oxyalkylene)triol is present from about 20 to about 25% w and has a molecular weight from about 1,000 to less than 5,000 and the second poly(oxylalkylene)triol is present from about 5 to about 7% w and has a molecular weight from about 5,000 to about 10,000, preferably with no poly(oxyalkylene)diol. In another embodiment, the poly(oxyalkylene)triol is present from about 20 to about 25% w and has a molecular weight from about 1,000 to about 5,000 and the poly(oxyalkylene)diol is present from about 5 to about 7% w and has a molecular weight from about 1,000 to about 5,000.

The component B of the plywood-patch composition is preferably entirely methylene diphenyl diisocyanate, though mixtures of diisocyantes are also permissible. Additionally, chain extenders including that amount utilized as a solvent in the catalyst solution may be present from 0 to about 5% w, preferably from 0 to about 2% w, based on the weight of Component A. Chain extenders in excess of these amounts has an adverse affect on adhesion (American Plywood Association boil test) and hardness (Shore A Durometer Hardness).

The following examples are for illustrative purposes only and are not meant to limit the claimed invention in any manner. The following tests have been utilized in some of the examples that follow:

Shore A durometer hardness test per ASTM D-2240-75, "Rubber Property-Durometer Hardness"

QUV Weatherometer staining test per American Plywood Association (APA) Bulletin No. Q-233 dated Feb. 24, 1988 wherein the color difference (delta E * ab) between a control specimen having no patching compound and a test specimen having patches thereon each of which has been overlayed with a white vinyl floor covering is measured and should not exceed 3.0.

EXAMPLES

Example 1

Synthesis of potassium 2-ethyl hexanoate using azeotropic distillation with isophorone and other solvents In this example, potassium 2-ethyl hexanoate was prepared utilizing potassium hydroxide and 2-ethyl hexanoic acid in a 1.01 molar ratio of the base to the acid. The potassium hydroxide used was a 50% aqueous solution. The acid was added first to a reaction vessel, then the 50% potassium hydroxide was added slowly so that the temperature did not exceed 80° C. After all the base had been added, the solution was cooled to about 45° C. Vacuum was then applied for the distillation of the water until a good reflux was achieved (the receiving flask was cooled in an ice water-acetone bath to condense the water vapors in the flask). In this case, at 27.5 inches of vacuum, a good reflux was achieved at 57° C. The removal of water from the potassium 2-ethyl hexanoate product may be followed by several methods, for example: (1) by measuring the water content of the reaction mixture using a Karl Fischer apparatus; (2) by measuring the amount of distillate in the receiving flask (allowing for some water vapor to be lost through the vacuum system); and (3) by following the viscosity of the reaction mixture as the reaction proceeds and water is distilled therefrom (the viscosity increases as the water is removed). In this example, the distillation was monitored by Gardner-Holdt viscosity standard tubes. This being the preferred method.

The distillation, followed by Gardner-Holdt viscosity standard tubes, was continued to a viscosity of Z, which is approximately 6 to 7% w water left in the reaction mixture. Foaming and solidification of the potassium 2-ethyl hexanoate product started to occur beyond this point. At this point, the vacuum and heat were discontinued until the solution cooled down to about 70° C. so that the isophorone solvent could be added without splashing. The amount of isophorone added to the potassium 2-ethyl hexanoate product was calculated based on the amount of potassium 2-ethyl hexanoate formed at 100% yield to give a 60% w catalyst in isophorone mixture. Once the isophorone had been added, vacuum distillation was then resumed, and heating as necessary to remove the isophorone/water azeotrope. At about 80° C. and about 29 inches of vacuum, good reflux was obtained for proper distillation. As the azeotrope was removed, the temperature required for distillation increased, therefore additional heat was supplied. The distillate in the receiving flask formed two layers, the top layer being isophorone and the bottom layer being water. The distallation was carried out to a Gardner-Holdt viscosity of X, at which point almost all the water had been removed from the potassium 2-ethyl hexanoate. Another indication of the end point was that the drip of distillate become very regular over into the receiving flask, indicating almost pure isophorone was being distilled. This occurred at a temperature of about 134° C. and about 29 inches of vacuum. The water content was then evaluated using a Karl Fischer apparatus and was determined to be about 0.07% w water in the potassium 2-ethyl hexanoate product. At room temperature, the liquid product had a dark brown color and had a solids content (potassium 2-ethyl hexanoate) of 54.3% and an isophorone content of about 45.6%. The product had a Brookfield viscosity of about 1406 centipoise at 25° C.

A similar procedure may be utilized to dry commercially available potassium-based catalysts (e.g., potassium 2-ethyl hexanoate) which are typically dissolved in a glycol such as diethylene glycol, for example, Dabco ® K-15 available from Air Products and Chemicals, Inc., Allentown, Pa. and Fomrez ® EC-683, EC-686 and EC-688 available from Witco Chemical Corporation, Houston, Tex. During the distillation process, the diethylene glycol solvent thereof is preferably substituted with isophorone since diethylene glycol tends to interfere with the reaction forming polyurethanes is present in excess of 5% w of Component A of the plywood-patch composition. Typically, commercially available potassium-based catalysts contain anywhere from about 1.5% w to about 4% w water, typically the water of reaction.

The solids content of the liquid product containing the dried potassium 2-ethyl hexanoate may be varied as desired by either distilling out additional isophorone or adding thereto additional solvent such as isophorone. If desired, all the solvent may be removed by distillation or oven heating leaving the potassium 2-ethyl hexanoate in a solid form. However, this solid form is difficult to solvate and remains a solid even at temperatures up to about 140° C. Once molten, solvents may be added to solvate the solid.

Table 1 provides a list of solvents for the potassium-based catalyst (potassium 2-ethyl hexanoate). Of these solvents, the preferred solvents for use in plywood-patch compositions are isophorone, diethylene glycol, poly (oxyalkylene) triol, dimethyl formamide, N,N-diethylformamide and methyl aceto acetate. Due to toxicity, flash point, bad smell, reaction interference, and/or solubility considerations, the remaining solvents may be utilized, but are not preferred for plywood-patch compositions.

TABLE 1

| Solvents for Solid Potassium 2-Ethyl Hexanoate | |
|---|---|
| Solvents | Solubility of Catalyst[a] |
| Ethyl acetate | partially soluble[b] |
| Hexane[e] | soluble |
| Sec-butyl alchohol | soluble |
| 2-ethyl 1-hexanol | partially soluble[b] |
| Octanol | soluble |
| Dimethyl formamide (DMF) | soluble |
| dimethyl sulfoxide (DMSO) | soluble |
| Methyl ethyl ketone (MEK) | soluble |
| Methyl aceto acetate | soluble[c] |
| Propylone carbonate | soluble[c,d] |
| Amyl acetate | soluble[c] |
| Isophorone | soluble |
| N,N—diethyl formamide | soluble[c] |
| Diethylene glycol | soluble |
| Poly(oxyalkylene)triol[f] | soluble |

[a] solubility test comprised combining 1 part by weight solvent to 2 parts by weight solid catalyst to see if soluble in the specified solvent.
[b] solid catalyst did not totally dissolve in solvent, even after heating to 125° C. or below boiling point of solvent, which ever was lower and then cooling back down to room temperature.
[c] had to be heated to 125° C. to go into solution.
[d] formed milky, viscous solution.
[e] when additional solvent was added, two layers were formed with the bottom layer containing the catalyst.
[f] Poly G 76-120 available from Olin Chemicals.

Example 2

Molecular Sieve Drying of Commercially Available Potassium-Based Catalyst

In this example, potassium 2-ethyl hexanoate in diethylene glycol, commercially available as Dabco ® K-15 catalyst available from Air Products and Chemicals Inc., was dried utilizing molecular sieve. The commercially available catalyst contained approximately 3% w water. The catalyst was dried by adding 5 parts by weight of molecular sieve in 100 parts of the commercial catalyst by weight and thoroughly stirring to a homogeneous mixture. The molecular sieve utilized was Molecular Sieve Type 4A in powdered form having a nominal pore diameter of about 4 angstroms available from Union Carbide Corporation, Tarrytown, N.Y. The resulting mixture was allowed to stand in an oven at about 100° to about 120° F. for approximately 12 hours, after which the liquid portion was decanted and the product thereof utilized as a dry potassium catalyst solution in the non-cellular polyurethane polywood-patch composition in some of the examples that follow. The water content of the dried catalyst as measured by Karl Fischer technique was less than 0.25% w, based on the weight of the catalyst. The water tolerance range of the catalyst to be used in the preferred plywood-patch compositions hereof was found to be 0.7% w or less.

Example 3

Plywood-Patch Composition Utilizing Molecular Sieve Dried Catalyst

In this example, the dried catalyst prepared according to the procedure of Example 2 herein was utilized to formulate a plywood-patch composition as shown in Table 2. As a comparative example, the commercially available (undried) catalyst was substituted for the dried catalyst of Example 2. Component A was combined with component B in the proportion of 10 parts by volume of component A to one part of by volume component B.

TABLE 2

| Plywood-Patch Composition Formulation | |
|---|---|
| Ingredients | Percent by Weight |
| Component A: | |
| Poly(oxyalkylene) triol[a] | 22.0 |
| Poly(oxyalkylene) diol[b] | 5.9 |
| Ethoxylated nonyl phenol[c] | 1.9 |
| Aromatic hydrocarbon distillate[d] | 6.0 |
| Dessicant[e] | 1.0 |
| Thixotrope[f] | 0.4 |
| Filler[g] | 62.0 |
| Pigment[h] | 0.1 |
| Anti-settling agent[i] | 0.2 |
| Catalyst solution[j] | 0.5 |
| Component B: | |
| Methylene diphenyl diisocyanate | |
| Ratio A to B (parts by volume): | 10 to 1 |

[a]Poly G 76-120 available from Olin Chemicals, Stamford, Conn., having a molecular weight of about 1500 and hydroxyl number of about 120.
[b]Poly G 20-28 available from Olin Chemicals, having a molecular weight of about 4000 and a hydroxyl number of about 28.
[c]Poly-Tergent B-350 available from Olin Chemicals.
[d]AC-100 available from Exxon Chemicals, having 100% aromatic content and having a flash point of about 105° F. and a boiling point of about 308° F.
[e]Molecular Sieve Type 4A is powder form available from Union Carbide Corporation, Tarrytown, New York, having a nominal pore diameter of about 4 angstroms.
[f]Cab-O-Sil Type M5 available from Cabot Corporation.
[g]Wingdale White available from Georgia Marble Co., Atlanta, Ga., a calcium carbonate having a mean particle size of about 6 microns.
[h]Yellow iron oxide commercially available as Mapico Yellow 1075A from Columbian Chemicals Co., Atlanta, Ga.
[i]Anti-Terra ® — U80 available from BYK Chemie USA, Wallingford, Conn. and described as a solution of a salt of unsaturated polyamine amide and higher molecules of acidic esters.
[j]The catalyst solution contains 75% w potassium 2-ethyl hexanoate and 25% w solvent, in this case being diethylene glycol, where % w is based on the weight of the catalyst solution.

At 77° F. and utilizing the dried catalyst, component A had a specific gravity of between about 1.5 to about 1.65 and a Brookfield viscosity between about 5000 and about 8000 centipoise both according to ASTM D-1638.

The density of the cured patch using the dried catalyst was between about 90 and about 101 lbs per cubic ft. and the Shore A durometer hardness was between about 60 and 70 after about 2 minutes following the mixing stage (i.e. mixing of Components A and B) and about 70 to 80 after 10 minutes following the mixing stage. The patch was tack free within about 30 to 35 seconds. Test specimens utilizing the cured patch based on the dry catalyst yielded a delta E *ab value of 0.16 (essentially zero). The test specimens also passed the APA Boil Test.

On the other hand, to achieve this level of reactivity, approximately 1.9 to about 2.8% w of the wet catalyst (commercially available catalyst, Dabco ® K-15 catalyst) was required in the above formulation. A noticeable foaming of the patch was observed. The Shore A durometer hardness of the patch after two minutes following the mixing stage was about 45 to 50, and after 2 hours then reached a Shore A hardness of about 60 to 68. The density of the cured patch using the wet catalyst was about 75 to 80 lbs per cubic ft. A cross section through the cured product utilizing the wet catalyst showed aeration weakening the structure of the compound. These negative effects were attributed to the 3% w water level present in the commercially available potassium-based catalyst.

Drying of the potassium-based catalyst as described above eliminated the foaming and produced product possessing desirable properties. The amount of dried catalyst required to produce the specified reactivity (that is tack free within about 30 to 35 seconds) was also considerably reduced as is readily apparent when comparing the 1.9 to 2.8% w wet catalyst solution required to the 0.45 to 0.6% w of the dried catalyst solution required. The 30 or 35 second time period required to achieve a tack free condition is a time interval representing the time between the application of the patch and the stacking of the plywood sheets.

Example 4

Plywood-Patch Composition Utilizing Molecular Sieve Dried Catalyst

In this example, the dried catalyst prepared according to the procedure of Example 2 herein was utilized to formulate a plywood-patch composition as shown in Table 3. Component A was combined with Component B in the proportion of 10 parts by volume of Component A to one part by volume of Component B.

TABLE 3

| Plywood-Patch Composition Formulation | |
|---|---|
| Ingredients | Percent by Weight |
| Component A: | |
| Poly(oxyalkylene) triol[a] | 22.0 |
| Poly(oxyalkylene) triol[b] | 6.9 |
| Aromatic hydrocarbon distillate[c] | 6.5 |
| Dessicant[d] | 1.0 |
| Thixotrope[e] | 0.4 |
| Filler[f] | 62.4 |
| Pigment[g] | 0.1 |
| Anti-settling agent[h] | 0.2 |
| Catalyst solutions[i] | 0.5 |
| Component B: | |
| Methylene diphenyl diisocyanate | |
| Ratio A to B | 10 to 1 |

TABLE 3-continued

| Plywood-Patch Composition Formulation | |
|---|---|
| Ingredients | Percent by Weight |
| (parts by volume): | |

[a] see note (a) Table 2.
[b] Poly G 85-28 available from Olin Chemicals, having a molecular weight of about 6000 and a hydroxyl number of about 28.
[c] see note (d) Table 2.
[d] see note (e) Table 2.
[e] see note (f) Table 2.
[f] Gammasperse 255 available from Georgia Marble Co., Atlanta, Ga., a calcium carbonate having a mean particle size of about 10 microns.
[g] see note (h) Table 2.
[h] see note (i) Table 2.
[i] see note (j) Table 2.

At 77° F., Component A had a Brookfield viscosity of about 7700 centipoise according to ASTM D-1638. The patch was tack free within about 30-35 seconds and exhibited improved hardness over a formulation comparable to that of Example 3 utilizing the dried catalyst. Test specimens yielded a delta E *ab value of essentially zero. The test specimens also passed the APA Boil Test.

Example 5

Plywood-Patch Compositions Utilizing the Azeotropically Distilled Dried Catalyst In this example, the dried catalyst prepared according to the procedure of Example 1 herein was utilized to formulate a plywood-patch composition as shown in Table 4. The catalyst/isophorone product of Example 1 was further diluted with isophorone and Poly G 76-120 [poly(oxyalkylene) triol available from Olin Chemical], such that 10% w of the catalyst/isophorone product was diluted with 90% w of the isophorone or Poly G 7-120, thereby forming the catalyst solutions indicated in Table 4. Table 5 gives the hardness, adhesion and tack-free results obtained using these solvents in the catalyst solution. Further improvement in these properties via optimization of the proportions of the various ingredients thereof such as to that formulation in Table 2 is clearly within the skill of the art.

TABLE 4

| Plywood-Patch Composition Formulation | |
|---|---|
| Ingredients | Percent by Weight |
| Component A: | |
| Poly(oxyalkylene) triol[a] | 22.1 |
| Poly(oxyalkylene) diol[b] | 6.0 |
| Aromatic hydrocabon distillate[c] | 6.5 |
| Anti-settling agent[d] | 0.2 |
| Dessicant[e] | 1.0 |
| Thixotrope[f] | 0.4 |
| Filler[g] | 63.5 |
| Catalyst solution[h] | 0.3 |

[a] see note (a) Table 2.
[b] Voranol 2140 available from Dow Chemical Co., having a molecular weight of about 4000 and in hydroxyl number of about 28.
[c] see note (d) Table 2.
[d] see note (i) Table 2.
[e] see note (e) Table 2.
[f] see note (f) Table 2.
[g] see note (g) Table 2.
[h] A 10% w solution of the catalyst/isophorone product of Example 1 in Isophorone or Poly G 76-120.

TABLE 5

| Solvent in Catalyst Solution | Time (sec) | Shore A Hardness | Adhesion[a] |
|---|---|---|---|
| Poly G 76-120:[b] | 60 | 34 | — |
| | 120 | 53 | 95 |
| | 180 | 63 | 100 |
| | 240 | 67 | 100 |
| | 300 | 68 | 100 |

TABLE 5-continued

| Solvent in Catalyst Solution | Time (sec) | Shore A Hardness | Adhesion[a] |
|---|---|---|---|
| | 360 | 71 | 100 |
| Isophorone:[c] | 60 | 26 | — |
| | 120 | 46 | 80 |
| | 180 | 53 | 100 |
| | 240 | 60 | 100 |
| | 300 | 64 | 100 |
| | 360 | 66 | 100 |

[a] Subjective test whereby patch on the test specimen is subjected to scraping in an attempt to remove the patch.
[b] Tack-free achieved 36 seconds following mixing and application of patch onto test specimen of plywood.
[c] Tack-free was achieved 41 seconds following mixing and application of patch onto test specimen of plywood. At 0.5% w level of catalyst solution, tack-free was achieved after 21 seconds with a maximum Shore A hardness of 71 after 360 seconds.

The reaction product of isocyanates and polyols and other hydroxyl containing compounds utilizing the substantially anhydrous potassium salt of carboxylic acid having from 2 to about 20 carbons may be further utilized as elastomers, coatings, foundry resins, adhesives, urethane-isocyanate sealants and caulkings, carpet backings and any structural polymers which incorporate such reaction products.

It will be apparent from the foregoing that many other variations and modifications may be made in the processes and the compositions hereinbefore described, by those having experience in this technology, without departing from the concept of the present invention. Accordingly, it should be clearly understood that the processes and compositions referred to in the foregoing description are illustrative only and are not intended to have any limitations on the scope of the invention.

We claim:

1. A process for preparing a polyurethane elastomer consisting essentially of the step of reacting a polyol selected from polyether polyols and polyester polyols with an organic polyisocyanate wherein the ratio of NCO groups to hydroxyl groups is from greater than about 1.00 to 1 to about 2.0 to 1 in the presence of a catalytic amount of a substantially anhydrous potassium salt of a carboxylic acid having from 2 to about 20 carbon atoms in the molecule.

2. The process according to claim 1 wherein the polyol has a molecular weight of about 1,000 to about 10,000.

3. The process according to claim 1 wherein the reaction is performed in the presence of about 0.01 to about 1.5% w, based on the weight of the reactants, of a substantially anhydrous potassium salt of a carboxylic acid having from 2 to about 20 carbon atoms in the molecule.

4. The process according to claim 1 wherein the reaction is performed in the presence of about 0.01 to about 1.5% w, based on the weight of the reactants, of a substantially anyhdrous potassium salt of a carboxylic acid having from about 8 to about 12 carbon atoms in the molecule.

5. The process according to claim 1 wherein the reaction is performed in the presence of about 0.1 to about 1.0% w based on the weight of the reactants, of a substantially anhydrous potassium 2-ethyl hexanoate.

6. A process for preparing a polyurethane elastomer consisting essentially of the step of reacting a polyol selected from polyether polyols and polyester polyols with an organic polyisocyanate, in the presence of an effective amount of a chain extender, wherein the ratio of NCO groups to hydroxyl groups is from greater than about 1.00 to 1 to about 2.0 to 1, in the presence of a catalytic amount of a substantially anhydrous potassium salt of a carboxylic acid having from 2 to about 20 carbon atoms in the molecule.

7. The process according to claim 6 wherein the polyol has a molecular weight of about 1,000 to about 10,000.

8. The process according to claim 6 wherein the reaction is performed in the presence of about 0.01 to about 1.5% w, based on the weight of the reactants, of a substantially anhydrous potassium salt of a carboxylic acid having from 2 to about 20 carbon atoms in the molecule and from about 1% w to about 20% w based on the weight of the reactants of a chain extender.

9. The process according to claim 6 wherein the substantially anhydrous potassium salt of a carboxylic acid having from 2 to about 20 carbon atoms in the molecule has a water content of less than about 0.7% w water based on the weight of the potassium salt of the carboxylic acid.

10. A plywood-patch composition based on a non-cellular polyurethane elastomer, said plywood-patch composition comprising the reaction product of a Component A and a Component B in the presence of a catalytic amount of a substantially anhydrous potassium salt of a carboxylic acid having from 2 to about 20 carbon atoms in the molecule,
wherein said Component A comprises
(a) from about 20 to about 32% w of a poly(oxyalkylene)triol,
(b) from 0 to about 7% w of a poly(oxyalkylene)diol,
(c) from 0 to about 2.5% w of a compatibilizer for said Component A and said Component B.
(d) from about 5.5% w to about 6.5% w of a solvent for said Component A having a flashpoint of less than about 110° F.,
(e) from 0 to about 1.5% w of a dessicant,
(f) from 0 to about 0.45% w of a thixotrope,
(g) from about 30 to about 70% w of a filler,
(h) from 0 to about 0.15% w of a pigment, and
(i) from 0 to about 0.25% w of an anti-settling agent,
wherein Component B is an organic polyisocyanate and
wherein the ratio of NCO groups to hydroxyl groups is from greater than about 1.00 to 1 to about 2.0 to 1.

11. The plywood-patch composition according to claim 10 wherein the poly(oxyalkylene)triol is a mixture of a first and a second poly(oxyalkylene)triol, wherein said first poly(oxyalkylene)triol is present from about 20 to about 25% w and has a molecular weight from about 1,000 to less than 5,000 and wherein said second poly(oxyalkylene)triol is present from about 5 to about 7% w and has a molecular weight from about 5,000 to about 10,000.

12. The plywood-patch composition according to claim 10 wherein said substantially anhydrous potassium salt of a carboxylic acid has a water content of less than about 0.7% w water based on the weight of said potassium salt of a carboxylic acid.

13. The plywood-patch composition according to claim 10 wherein the poly(oxyalkylene)triol is present from about 20 to about 25% w and has a molecular weight of from about 1,000 to about 5,000 and wherein the poly(oxyalkylene)diol is present from about 5% to about 7% w and has a molecular weight of between 1,000 and about 5,000.

14. The plywood-patch composition according to claim 13 wherein the compatibilizer is present between from about 1.4% w to about 2.5%, wherein the dessicant is present from about 0.5% w to about 1.5% w, wherein the thixotrope is present from about 0.35% w to about 0.45% w, wherein the filler is present from about 50% w to 65% w, wherein the pigment is present from about 0.05% w to about 0.15% w, and the anti-settling agent is present from about 0.15% w to about 0.25% w.

15. A process for preparing a plywood-patch composition based on a non-cellular polyurethane elastomer consisting essentially of the step of reacting a Component A and a Component B in the presence of a catalytic amount of a substantially anhydrous potassium salt of a carboxylic acid having from 2 to about 20 carbon atoms in the molecule,
wherein said Component A is prepared by mixing
(a) from about 20 to about 32% w of a poly(oxyalkylene)triol,
(b) from 0 to about 7% w of a poly(oxyalkylene)diol,
(c) from 0 to about 2.5% w of a compatibilizer for said Component A and said Component B,
(d) from about 5.5 to about 6.5% w of a solvent for said Component A having a flashpoint of less than about 110° F.,
(e) from 0 to about 1.5% w of a dessicant,
(f) frm 0 to about 0.45% w of a thixotrope,
(g) from about 30 to about 70% w of a filler,
(h) from 0 to about 0.15% w of a pisgment, and
(i) from 0 to about 0.25% w of an anti-settling agent,
wherein Component B is an organic polyisocyanate and
wherein the ratio of NCO groups to hydroxyl groups is from greater than about 1.00 to 1 to about 2.0 to 1.

16. The process according to claim 15 wherein the poly(oxyalkylene)triol is a mixture of a first and a second poly(oxyalkylene)triol, wherein the first poly(oxyalkylene)triol is present from about 20 to about 25% w and has a molecular weight from about 1,000 to less than 5,000 and the second poly(oxyalkylene)triol is present from about 5 to about 7% w and has a molecular weight from about 5,000 to about 10,000.

17. The process according to claim 15 wherein the poly(oxyalkylene)triol is present from about 20 to about 25% w and has a molecular weight from about 1,000 to about 5,000 and wherein the poly(oxyalkylene)diolis present from about 5 to about 7% w and has a molecular weight from about 1,000 to about 5,000.

18. The process according to claim 15 wherein the substantially anhydrous potassium salt of a carboxylic acid having from 2 to about 20 carbon atoms in the molecule has a water content of less than about 0.7% w water based on the weight of the potassium salt of the carboxylic acid.

19. The process according to claim 18 wherein the substantially anhydrous potassium salt of the carboxylic acid having from 2 to about 20 carbon atoms in the molecule is prepared by the process comprising the steps of
(a) reacting potassium hydroxide with a carboxylic acid having from 2 to about 20 carbon atoms in the molelcule and removing the water of reaction together with any water originally in solution with the potassium hydroxide by a method selected from the group consisting of
(i) azeotropic distillation utilizing an azeotrope forming solvent for the potassium salt of the carboxylic acid,
(ii) mixing therewith a suitable non-aqueous solvent for the potassium salt of the carboxylic acid and a dessicant for adsorbing the water of reaction plus any water originally in solution with the potassium hydroxide and thereafter decanting the mixture, thereby producing the substantially anhydrous potassium salt of the carboxylic acid, and
(iii) vacuum distilling the reaction mixture to remove the water thereof leaving the substantially anhydrous potassium salt of the carboxylic acid in either a viscous liquid or a solid form and subsequently adding a suitable solvent for the substantially anhydrous potassium salt of the carboxylic acid thereto and solvating same.

* * * * *